US010131398B1

(12) United States Patent
Chen

(10) Patent No.: US 10,131,398 B1
(45) Date of Patent: Nov. 20, 2018

(54) SHOCK-ABSORBENT STRUCTURE OF ELECTRIC CARRIER

(71) Applicant: KUIANDA Company Limited, Kaohsiung (TW)

(72) Inventor: Mao-Chiang Chen, Kaohsiung (TW)

(73) Assignee: KUIANDA COMPANY LIMITED, Kaohsiung (TW)

( * ) Notice: Subject to any disclaimer, the term of this patent is extended or adjusted under 35 U.S.C. 154(b) by 49 days.

(21) Appl. No.: 15/597,903

(22) Filed: May 17, 2017

(51) Int. Cl.
*B62K 21/08* (2006.01)
*B62K 25/04* (2006.01)
*A61G 5/10* (2006.01)
*B62K 5/00* (2013.01)

(52) U.S. Cl.
CPC ............ *B62K 21/08* (2013.01); *A61G 5/1051* (2016.11); *B62K 25/04* (2013.01); *B62K 2005/001* (2013.01); *B62K 2202/00* (2013.01)

(58) Field of Classification Search
CPC .... B62K 21/08; B62K 25/04; B62K 2202/00; B62K 5/007; B62K 5/08; B62K 2005/001; B62K 2025/042
See application file for complete search history.

(56) References Cited

U.S. PATENT DOCUMENTS

| | | | | |
|---|---|---|---|---|
| 2,191,663 A | * | 2/1940 | Hussy | B62K 21/08 280/279 |
| 2,279,874 A | * | 4/1942 | Rockola | B62K 5/02 180/227 |
| 4,138,131 A | * | 2/1979 | Sommer | B62K 9/00 280/220 |
| 5,826,670 A | * | 10/1998 | Nan | A61G 5/047 180/15 |
| 9,718,428 B1 | * | 8/2017 | Mothfar | B60R 21/13 |
| 2008/0067768 A1 | * | 3/2008 | Yang | B62K 5/007 280/93.502 |
| 2011/0017541 A1 | * | 1/2011 | He | B62K 5/007 180/291 |
| 2015/0137481 A1 | * | 5/2015 | Manternach | B62K 5/007 280/400 |
| 2016/0355229 A1 | * | 12/2016 | Chen | B62K 5/027 |
| 2017/0106935 A1 | * | 4/2017 | Hara | B62K 5/10 |
| 2017/0259875 A1 | * | 9/2017 | Chang | B62K 5/01 |

* cited by examiner

Primary Examiner — Drew J Brown
(74) Attorney, Agent, or Firm — Muncy, Geissler, Olds & Lowe, P.C.

(57) ABSTRACT

A shock-absorbent structure of an electric carrier is assembled with a steering system. The steering system includes a steering axis and two wheels linked with the steering axis. The shock-absorbent structure of an electric carrier includes a steering assembly and a wheel axle assembly. The steering assembly includes a bushing, a steering connecting portion connected to the bushing, and an accommodating space. The wheel axle assembly includes a body, two axle connecting members respectively disposed at two ends of the body, a body opening penetrating the body, an elastic body disposed between the body and the bushing, and a pressing member passing the body opening. The pressing member abuts at one end of the body corresponding to the bushing when the elastic body is in a diastolic state, and moves away from the bushing when the elastic body is in a compressed state.

5 Claims, 4 Drawing Sheets

SHOCK-ABSORBENT STRUCTURE OF ELECTRIC CARRIER

FIELD OF THE INVENTION

The present invention relates to a shock-absorbent structure of an electric carrier, and particularly to a cost-effective shock-absorbent structure of an electric carrier.

BACKGROUND OF THE INVENTION

In many developed countries, the social structure has progressed towards aging in the recent years, and the elderly frequently suffer from impaired physical mobility due to biological factors such as function aging or diseases. To provide the elderly with better mobility, various electric scooters have become available. With the coordination of barrier-free spaces, not only the living quality of the elderly is increased, but also burdens on caretakers are alleviated. Further, electric scooters provide the physical challenged with similar assistance.

A conventional shock-absorbent structure of an electric transportation means primarily includes a frame, a front wheel and a back wheel. The frame and the front wheel are connected through a hydraulic shock absorber. The hydraulic shock absorber is usually provided with an oil tank and a piston. When the electric transportation means rides on bumpy road conditions, the piston connected to the frame applies a pressure on the oil tank, and the associated vibration amplitude is absorbed by oil in the oil tank to achieve a shock absorbing effect and enhance riding comfort. However, such shock-absorbent structure is quite complicated, and the oil tank also needs a sufficient space for storing oil and thus increases the overall volume of the shock-absorbent structure. Therefore, there is a need for a solution that overcomes issues of the prior art.

SUMMARY OF THE INVENTION

It is an object of the present invention to solve issues of a complicated structure, high costs and a large volume of a conventional hydraulic shock absorber.

To achieve the above object, the present invention provides a shock-absorbent structure of an electric carrier. The shock-absorbent structure is assembled with a steering system, which includes a steering axis and two wheels linked with the steering axis. The shock-absorbent structure of an electric carrier includes a steering assembly and a wheel axle assembly. The steering assembly includes a bushing pivotally connected to the steering axis, a steering connecting portion connected to the bushing and linked with the steering axis, and an accommodating space formed by a recess of the steering connecting portion. The wheel axle assembly includes a body disposed in the accommodating space, two axle connecting members disposed at two ends of the body and connected to the wheels, respectively, a body opening penetrating the body, an elastic body disposed between the body and the bushing, and a pressing member passing the body opening and movably connected to the body and the steering connecting portion. When the elastic body is in a diastolic state, the pressing member abuts at one end of the body corresponding to the bushing. When the elastic body is in a compressed state, the pressing member moves away from the bushing, and the elastic body at the same time provides an elastic force for counteracting a vibration amplitude.

Further, the steering connecting portion includes an upper plate adjacent to the bushing, two side plates respectively connected to two opposite ends of the upper plate and extending away from the bushing, and a side plate opening penetrating each of the side plates.

Further, the body opening has long sides perpendicular to a connecting line of each of the wheels, and short sides parallel to the connecting line of each of the wheels. When the elastic body enters the diastolic state or the compressed state, the side plate opening slidably moves along the long sides and has its position correspond to the body opening.

Further, the steering assembly includes two balancing shafts connected from the bushing to two opposite ends of the steering connecting portion, respectively. The elastic body is disposed correspondingly to an extended position of each of the balancing shafts.

Further, the elastic body is a spring.

Thus, the present invention provides following effects as opposed to the prior art.

In the present invention, the elastic body pushes the upper plate of the steering connecting portion upwards, and the pressing member is disposed in the side plate opening. When an electric carrier generates vibrations, the pressing member is drawn by the elastic body and performs back and forth movements in the body opening, and the elastic body at the same time provides a buffering effect, thereby achieving the effect of absorbing vibrations while a scooter progresses. Therefore, the present invention replaces a conventional hydraulic shock absorber, which suffers from issues of an increased overall volume and high production costs caused by an oil tank that stores a large amount of buffering oil.

DETAILED DESCRIPTION OF THE PREFERRED EMBODIMENTS

Figure 1:
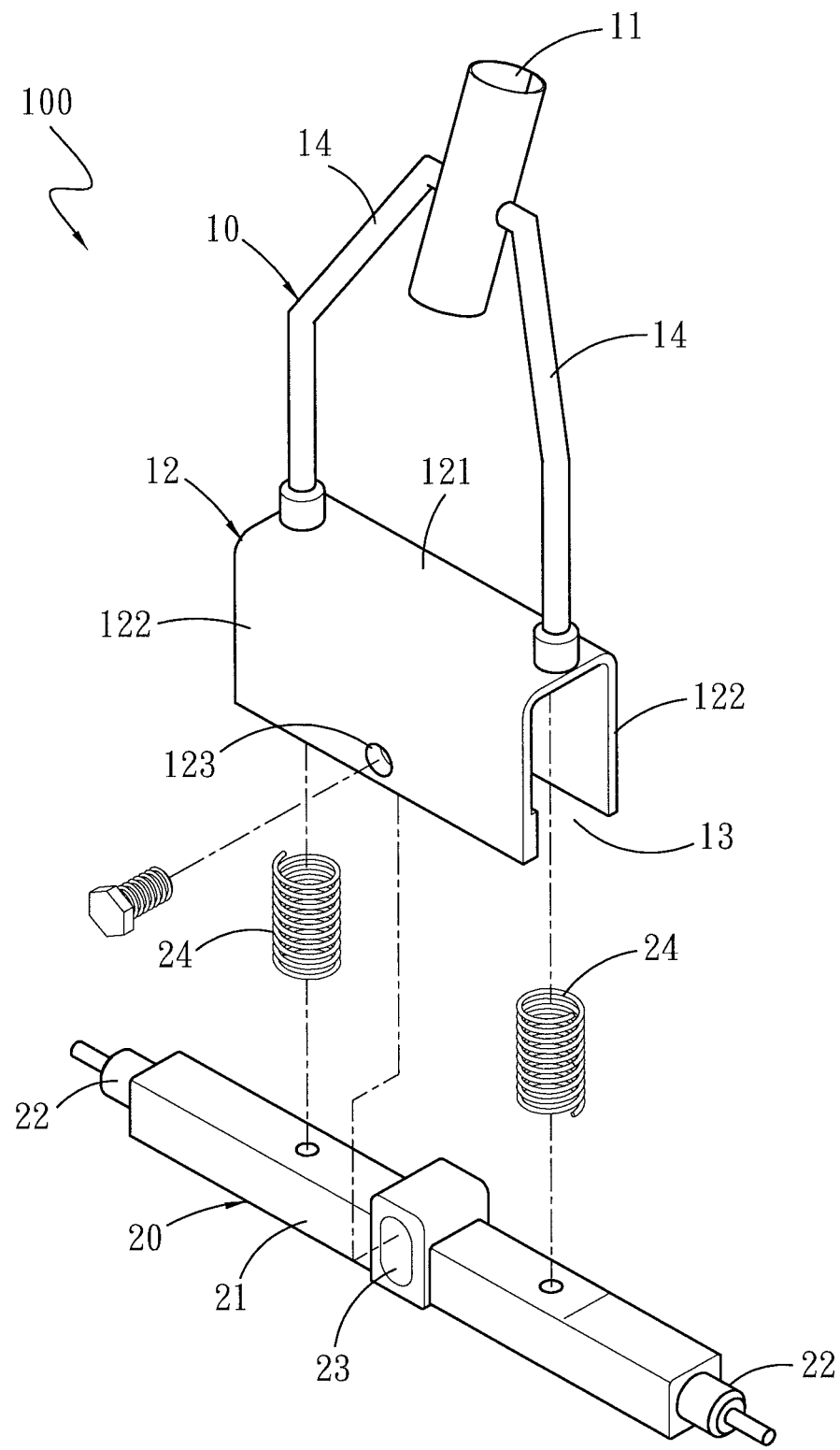
FIG. 1 is an exploded perspective view of a shock-absorbent structure of an electric carrier of the present invention.
Figure 2:
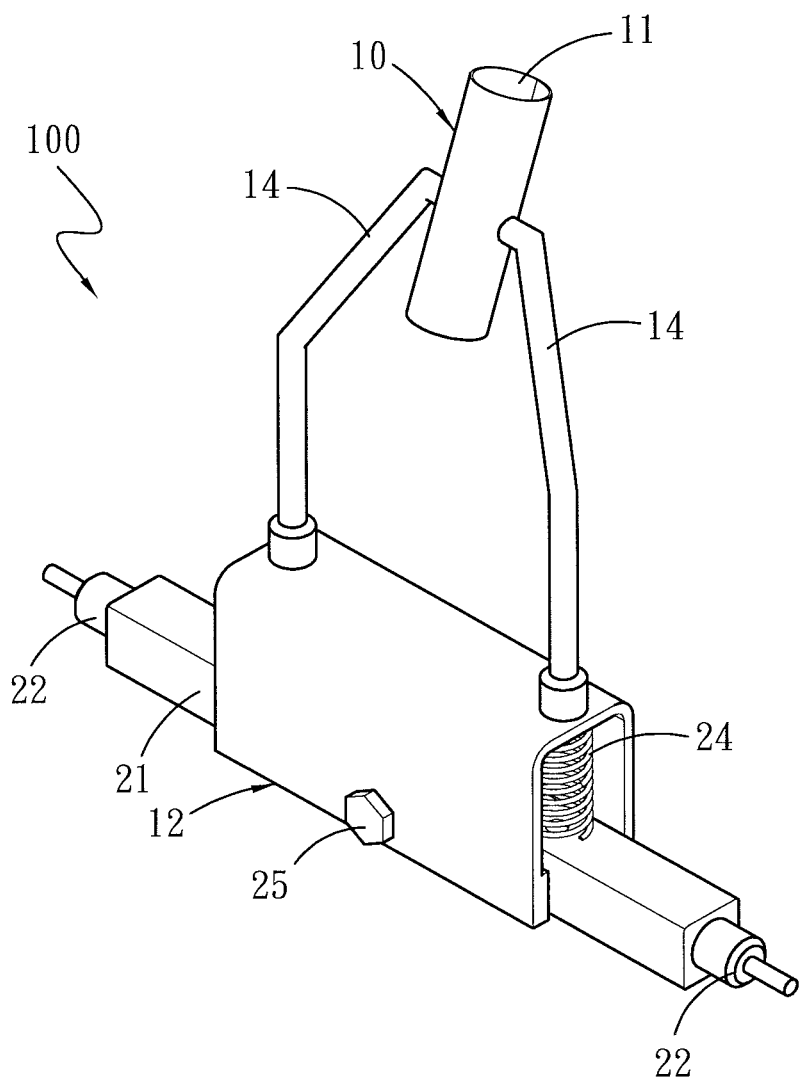
FIG. 2 is a perspective view of a shock-absorbent structure of an electric carrier of the present invention.

Technical contents of the present invention are given with the accompanying drawings below. Referring to FIG. 1 and FIG. 2, the present invention provides a shock-absorbent structure 100 of an electric carrier. The shock-absorbent structure 100 is assembled with a steering system 300. The steering system 300 includes a steering axis 310, and two wheels 320 linked with the steering axis 310. The shock-absorbent structure 100 of an electric carrier includes a steering assembly 10 and a wheel axle assembly 20. In one embodiment, the steering system 300 may further include a suspension system (not shown) that is essential in an operation of an electric scooter. Associated details are generally known to one person skilled in the art, and shall be omitted herein.

The steering assembly 10 includes a bushing 11 pivotally connected to the steering axis 310, a steering connecting portion 12 connected to the bushing 11 and linked with the steering axis 310, and an accommodating space 13 formed by a recess of the steering connecting portion 12. In the present invention, when a user controls the steering axis 310 to rotate, the bushing 11 is simultaneously linked to change a progressing direction of the scooter.

The wheel axle assembly 20 includes a body 21 disposed in the accommodating space 13, two axle connecting members 22 connected to two ends of the body 21 and connected to the wheels 320, respectively, a body opening 23 penetrating the body 21, an elastic body 24 disposed between the body 21 and the bushing 11, and a pressing member 25 passing the body opening 23 and movably connected to the body 21 and the steering connecting portion 12. In this embodiment, for example, the elastic body 24 may be an object that rebounds after being compressed, such as a spring and polyurethane. The pressing member 25 may be a combination of a screw and a nut. In this embodiment, the steering connecting portion 12 includes an upper plate 121 adjacent to the bushing 11, two side plates 122 respectively connected to two opposite ends of the upper plate 121 and extending away from the bushing 11, and a side plate opening 123 penetrating each of the side plates 122 to cause the steering connecting portion 12 to be surrounded and positioned by the side plates 122. Further, the body opening 23 has long sides perpendicular to a connecting line of each of the wheels 320, and short sides parallel to the connecting line of each of the wheels 320. When the elastic body 24 enters a diastolic or compressed state, the side plate opening 123 may slidably move along the long sides to have its position correspond to the body opening 23.

Figure 3:
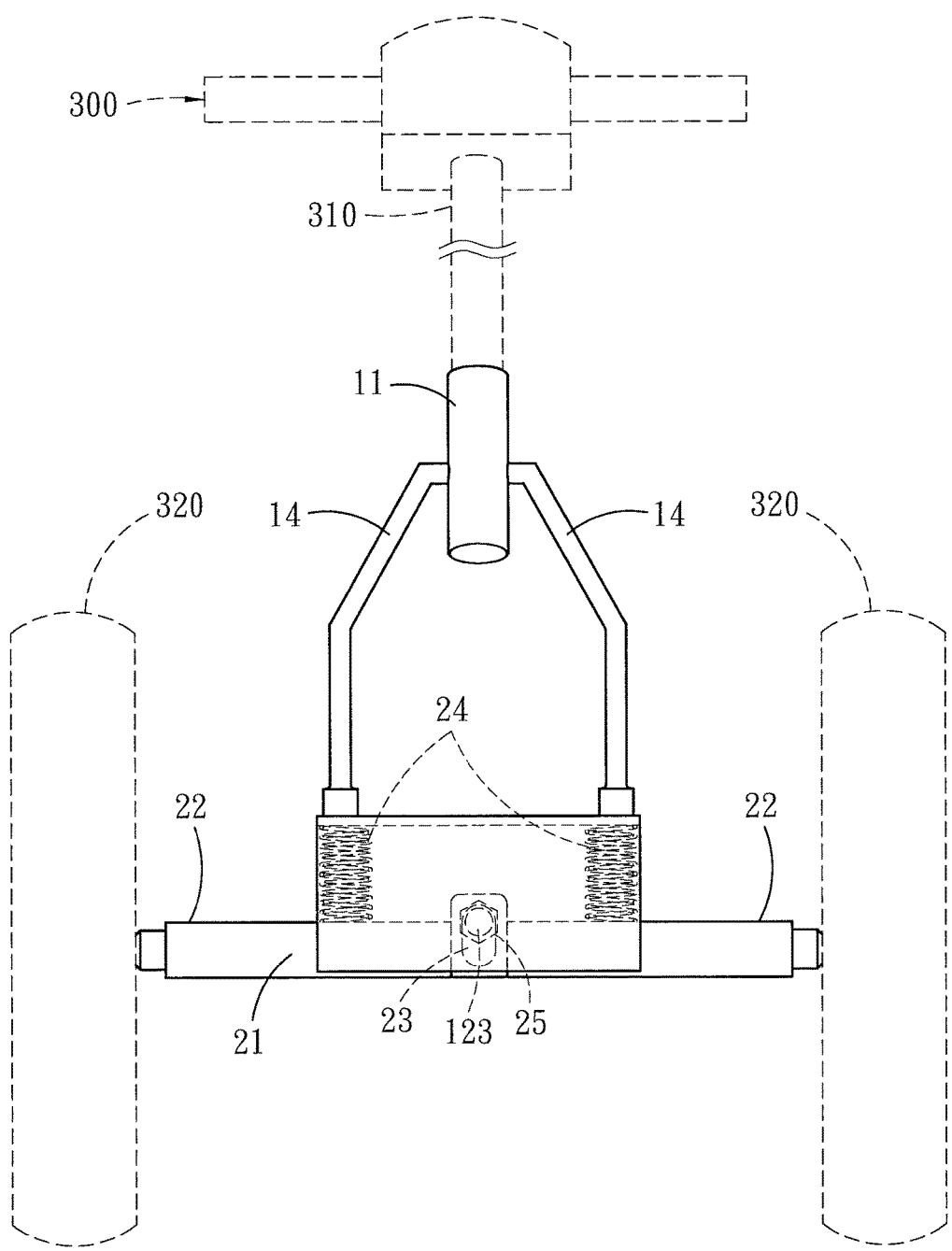
FIG. 3 is a perspective view according to a first embodiment of the present invention.
Figure 4:
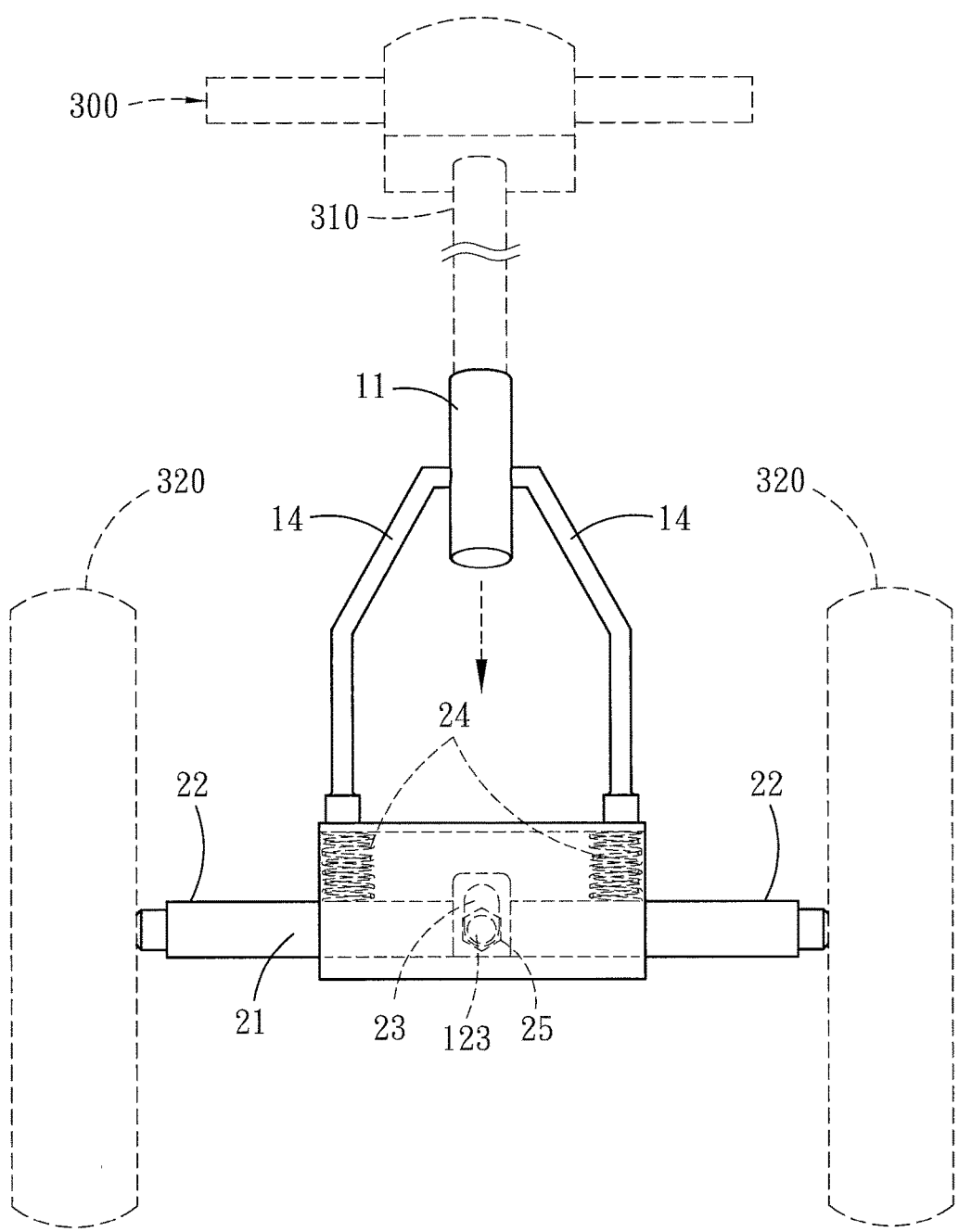
FIG. 4 is a schematic diagram of an operation according to the first embodiment of the present invention.

Operation principles of the shock absorbing function of the present invention are as follows. Referring to FIG. 3, when the elastic body 24 is in a diastolic state, the upper plate 121 is pushed towards the upper direction of the diagram, such that the pressing member 25 abuts at one end of the body 21 corresponding to the bushing 11. In the present invention, under the premise that the elastic body 24 needs to at least be able to bear the steering assembly 10 and the steering system 300, it still needs to be able to provide an elastic force for pushing the steering assembly 10 upwards in order to achieve the shock absorbing effect. As shown in FIG. 4, in the event that the steering assembly 10 and the steering system 300 move towards the lower direction of FIG. 4 due to vibrations while progressing, the elastic body 24 is in a compressed state, and the pressing member 25 moves away from the bushing 11. At this point, the elastic body 24 generates a vertical amplitude while shock buffering, and causes the pressing member 25 to be gradually restored towards the bushing 11. Through the above structure, the present invention is capable of absorbing vibrations of a vehicle body while a scooter progresses to reduce the level of shaking of a passenger seat, thereby achieving the effect of better riding comfort.

In the embodiment, the steering assembly 10 further includes two balancing shafts 14 connected from the bushing 11 to two opposite ends of the steering connecting portion 12, respectively. The elastic body 24 is correspondingly disposed at an extended position of each of the balancing shafts 14. The above structure allows the elastic force that the elastic body 24 provides to evenly support the steering connecting portion 12. If the vehicle body becomes tilted due to bumpy road conditions while progressing, the elastic body 24 provides a balancing elastic force from two lower sides of the steering axis 310 to further enhance an anti-tilting capability of the present invention.

What is claimed is:

1. A shock-absorbent structure of an electric carrier, assembled with a steering system, the steering system comprising a steering axis and two wheels linked with the steering axis, the shock-absorbent structure of an electric carrier comprising:

a steering assembly, comprising a bushing pivotally connected to the steering axis, a steering connecting portion connected to the bushing and linked with the steering axis, and an accommodating space formed by a recess of the steering connecting portion; and a wheel axle assembly, comprising a body disposed in the accommodating space, two axle connecting members disposed at two ends of the body and connected to the two wheels, respectively, a body opening penetrating the body, an elastic body disposed between the body and the bushing, and a pressing member passing the body opening and movably connected to the body and the steering connecting portion;

wherein, when the elastic body is in a diastolic state, the pressing member abuts at one end of the body corresponding to the bushing; when the elastic body is in a compressed state, the pressing member moves away from the bushing, and simultaneously provides an elastic force for counteracting a vibration amplitude.

2. The shock-absorbent structure of an electric carrier of claim 1, wherein the steering connecting portion comprises an upper plate adjacent to the bushing, two side plates respectively connected to two opposite ends of the upper plate, and a side plate opening penetrating each of the side plates.

3. The shock-absorbent structure of an electric carrier of claim 2, wherein the body opening has two long sides perpendicular to a connecting line of each of the wheels and short sides parallel to the connecting line of each of the wheels, and the side plate opening slidably moves along the long sides to have a position thereof correspond to the body opening when the elastic body enters the diastolic or compressed state.

4. The shock-absorbent structure of an electric carrier of claim 1, wherein the steering assembly further comprises two balancing shafts connected from the bushing to two opposite ends of the steering connecting portion, respectively, and the elastic body is correspondingly disposed at an extended position of each of the balancing shafts.

5. The shock-absorbent structure of an electric carrier of claim 1, wherein the elastic body is a spring.

* * * * *